(12) United States Patent
Poliner et al.

(10) Patent No.: US 12,205,443 B2
(45) Date of Patent: Jan. 21, 2025

(54) SMART TEXTILE ITEMS DISPENSING AND RETURN SYSTEMS

(71) Applicant: POLYTEX TECHNOLOGIES LTD., Caesarea (IL)

(72) Inventors: Tomer Poliner, Caesarea (IL); Etgar Marcus, Alloney Abba (IL)

(73) Assignee: POLYTEX TECHNOLOGIES LTD., Caesarea (IL)

( * ) Notice: Subject to any disclaimer, the term of this patent is extended or adjusted under 35 U.S.C. 154(b) by 801 days.

(21) Appl. No.: 17/187,817

(22) Filed: Feb. 28, 2021

(65) Prior Publication Data

US 2021/0272259 A1     Sep. 2, 2021

Related U.S. Application Data

(60) Provisional application No. 62/983,696, filed on Mar. 1, 2020.

(51) Int. Cl.
| | |
|---|---|
| *G07F 7/06* | (2006.01) |
| *G06F 18/2431* | (2023.01) |
| *G06N 20/00* | (2019.01) |
| *G06T 7/00* | (2017.01) |
| *G06V 10/764* | (2022.01) |
| *G06V 20/52* | (2022.01) |
| *G07F 11/16* | (2006.01) |

(52) U.S. Cl.
CPC ............ *G07F 7/06* (2013.01); *G06F 18/2431* (2023.01); *G06N 20/00* (2019.01); *G06T 7/0002* (2013.01); *G06V 10/764* (2022.01); *G06V 20/52* (2022.01); *G07F 11/165* (2013.01); *G06T 2207/10048* (2013.01); *G06T 2207/10116* (2013.01); *G06T 2207/30124* (2013.01)

(58) Field of Classification Search
CPC ...... G07F 7/06; G07F 11/165; G06F 18/2431; G06N 20/00; G06N 3/08; G06T 7/0002; G06T 2207/10048; G06T 2207/10116; G06T 2207/30124; G06T 2207/20081; G06T 2207/20084; G06T 7/0004; G06V 10/764; G06V 20/52

See application file for complete search history.

(56) References Cited

U.S. PATENT DOCUMENTS

| 6,330,856 B1 | 12/2001 | Fitzgerald et al. |
| 7,474,938 B2 | 1/2009 | Poliner |

(Continued)

FOREIGN PATENT DOCUMENTS

| CN | 107704882 | 2/2018 |
| EP | 2378495 A1 | 10/2011 |

*Primary Examiner* — Bobbak Safaipour
(74) *Attorney, Agent, or Firm* — The Roy Gross Law Firm, LLC; Roy Gross

(57) ABSTRACT

Provided herein are textile items return systems including which are configured to identify the type and/or condition of a returned textile item. The systems include an image acquisition device configured to acquire image data of a returned textile item and identification module which is configured to receive the acquired image data and identify one or more item parameters of the returned textile item using a suitable classification algorithm. Further provided are textile items dispensing and return (TIDR) systems including the textile items return system.

19 Claims, 4 Drawing Sheets

(56) References Cited

U.S. PATENT DOCUMENTS

| | | | |
|---|---|---|---|
| 8,204,620 B2* | 6/2012 | Mallett | A61B 50/13 |
| | | | 700/242 |
| 8,875,942 B2 | 11/2014 | Poliner | |
| 11,692,293 B2* | 7/2023 | Kim | D06F 34/28 |
| | | | 68/12.02 |
| 2008/0025826 A1 | 1/2008 | Saether | |
| 2015/0012396 A1 | 1/2015 | Puerini et al. | |
| 2017/0000277 A1* | 1/2017 | Johnson | A47G 25/1407 |
| 2020/0116627 A1* | 4/2020 | Kessler | D06F 34/18 |
| 2020/0126027 A1* | 4/2020 | Mahajan | G06Q 10/087 |
| 2021/0277565 A1* | 9/2021 | Kessler | G01N 21/94 |

* cited by examiner

```
┌─────────────────────────────────────────────────────────────────┐
│ Obtaining image data, and, optionally, non-visual sensor data,  │
│ of each of a plurality of textile items in a training set of    │
│ textile items, wherein for each textile item, at least one      │
│ value of one or more item parameters of the textile item is     │
│ known.                                                          │
└─────────────────────────────────────────────────────────────────┘
                                │
                                │  ⎯⎯ 310
                                ▼
┌─────────────────────────────────────────────────────────────────┐
│ Using artificial intelligence learning tools to train the       │
│ computational module by correlating the obtained image data,    │
│ and, optionally, non-visual sensor data, to the known values,   │
│ such as to maximize an overall identification percentage of     │
│ the textile items in the training set, thereby generating a     │
│ classification algorithm.                                       │
└─────────────────────────────────────────────────────────────────┘
                                │
                                │  ⎯⎯ 320
                                ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Obtaining image data, and, optionally, non-visual sensor data,  │
│ of each of a plurality of textile items in an *additional*      │
│ training set of textile items, wherein for each textile item,   │
│ at least one value of one or more item parameters of the        │
│ textile item is known.                                          │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                │
                                │  ⎯⎯ 330
                                ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Using the artificial intelligence learning tools to modify the  │
│ computational module such as to maximize an overall             │
│ identification percentage of the textile items in the both      │
│ original training set and the additional training set, thereby  │
│ updating the classification algorithm.                          │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                   ⎯⎯ 340
```

Fig. 3

SMART TEXTILE ITEMS DISPENSING AND RETURN SYSTEMS

CROSS REFERENCE TO RELATED APPLICATIONS

This application claims priority to U.S. 62/983,696 entitled SMART TEXTILE ITEMS DISPENSING AND RETURN SYSTEMS filed Mar. 1, 2020. The contents of this application are incorporated by reference in their entirety.

TECHNICAL FIELD

The present disclosure relates generally to "smart" textile items dispensing and return systems.

BACKGROUND OF THE INVENTION

Automated dispensing (and return) machines, for example, vending machines, are used to automatically dispense and/or collect various items and articles, such as clothing, towels, food items, beverages, newspapers, and the like. The size and the mode of operation of a dispensing machine may vary based on its intended use and the type of items dispensed (and returned). For example, clothes dispensing machines may include suitable mechanical means for grasping, conveying, and dispensing a clothing item(s) selected by a user, e.g. via a user interface on the clothes dispensing machine. Some clothes dispensing systems may further allow the return of used (worn) clothing items. For example, U.S. Pat. No. 7,474,938 is directed to an interactive automated article dispensing system, while U.S. Pat. No. 8,875,942 is directed to a side-grip method for grasping textile items in a vending machine.

Nevertheless, to the best of the Applicant's knowledge, commercially available clothes dispensing machines-even when interactive-do not have the capacity to identify clothes items, particularly, returned clothes items, nor the capacity to provide an indication as to the condition of a returned clothes item (e.g. whether the clothes item is soiled).

SUMMARY OF THE INVENTION

Aspects of the disclosure, according to some embodiments thereof, relate to "smart" textile items dispensing and return machines. More specifically, but not exclusively, aspects of the disclosure, according to some embodiments thereof, relate to textile items return systems, which are configured to identify the type and/or condition of a returned textile item.

The textile items return systems of the present disclosure advantageously employ artificial intelligence tools, such as computer vision tools, to allow for automatic identification of quality and/or quantity of returned textile items. Consequently, the textile items return systems of the present disclosure allow for real-time management of inventory. Further, according to some embodiments, the textile items return systems are configured to employ artificial intelligence tools, such as machine learning tools, to "learn on the job", thereby allowing for continual improvement of the identification capacities of the textile items return systems. This learning capacity may be especially useful when new and different inventories are introduced.

Thus, according to an aspect of some embodiments, there is provided a textile items return system including a textile items return unit and a textile items identification module. The textile items return unit includes:
   An image acquisition device configured to acquire image data of a returned textile item.
   A return compartment configured to accommodate a returned textile item such as to allow the image acquisition device to acquire image data of the returned textile item.

The textile items identification module includes one or more processors and one or more memory components. The textile items identification module is configured to receive the acquired image data and, based at least thereon, identify one or more item parameters of the returned textile item, using a classification algorithm configured to correlate image data of a textile item to one or more item parameters of the textile item.

According to some embodiments of the textile items return system, the classification algorithm includes an image recognition sub-algorithm.

According to some embodiments of the textile items return system, the textile items include clothing, linen, and/or towels.

According to some embodiments of the textile items return system, the one or more item parameters include one or more of: at least one type, at least one characteristic, and at least one condition of a textile item.

According to some embodiments of the textile items return system, the at least one type of the textile item is selected from clothing, bed linen, tablecloths, and/or towels.

According to some embodiments of the textile items return system, the one or more item parameters further include one or more types of clothing. The one or more types of clothing include scrubs, shirts, pants, dress, skirts, socks, underwear, and/or bathrobes.

According to some embodiments of the textile items return system, the at least one characteristic of the textile item includes one or more of a size, measurements, weight, and color.

According to some embodiments of the textile items return system, the at least one condition of the textile item includes one or more of a level of cleanliness of, a degree of dampness of, and a degree of damage to the textile item.

According to some embodiments of the textile items return system, the level of cleanliness includes at least clean and soiled, the degree of dampness includes at least dry and wet, and the degree of damage includes at least undamaged and damaged and/or disposable (e.g. to be disposed of or recycled).

According to some embodiments of the textile items return system, the image acquisition device includes one or more digital cameras.

According to some embodiments of the textile items return system, the image acquisition device includes one or more infrared cameras.

According to some embodiments of the textile items return system, the image acquisition device includes an X-ray camera and/or the return compartment includes one or more non-visual sensors including one or more from a weight sensor and/or a metal detector.

This potentially allows detecting when a returned item is non-textile and/or when a returned textile item includes a non-textile object.

According to some embodiments of the textile items return system, the textile items identification module is further configured to adjust the classification algorithm based on one or more pre-determined correspondences pertaining to a set of textile items. Each pre-determined correspondence relates at least one value of the one or more item parameters, of a respective textile item from the set, to at least image data of the textile item.

According to some embodiments of the textile items return system, the textile items identification module includes a primary data processing module and a classification module. The primary data processing module is configured to process image data—and, optionally, primary data, received from the one or more non-visual sensors—to obtain one or more features and/or patterns of a textile item. The classification module is configured to process the one or more features and/or patterns to obtain the one or more item parameters of the textile item.

According to some embodiments of the textile items return system, the textile items identification module further includes a learning module configured to adjust the classification algorithm based on the one or more pre-determined correspondences pertaining to a set of textile items.

According to some embodiments of the textile items return system, the textile items return unit includes a user interface allowing a user to input the at least one value of the one or more item parameters of a returned textile item, and/or wherein the textile items return unit includes a communication unit allowing a user to use a mobile computational device (e.g. a mobile communication device such as a smartphone) of the user to input the at least one value of the one or more item parameters of a returned textile item, thereby enabling determining a correspondence between the at least one value and image data of the textile item after acquisition thereof by the image acquisition device.

According to some embodiments of the textile items return system, the textile items return unit includes the textile items identification module.

According to some embodiments of the textile items return system, the textile items return unit further includes a communication unit and a control circuitry configured to operate the return unit. The textile items identification module is constituted by one or more online servers and is functionally associated with the control circuitry via the communication unit.

According to some embodiments of the textile items return system, the textile items return unit further includes a communication unit and a control circuitry configured to operate the return unit. The textile items identification module is distributed, such that some, but not all, of the modules, making up the textile items identification module, are constituted by one or more online servers and are functionally associated with the rest of the modules (making up the textile items identification module) via the communication unit.

According to some embodiments of the textile items return system, wherein the textile items identification module further includes the learning module, the learning module is constituted by the one or more on-line servers.

According to some embodiments of the textile items return system, the textile items return system is further configured to sort returned textile items to a plurality of compartments and/or output slots, based on the identified item parameters of the returned textile items.

According to some embodiments of the textile items return system, the textile items return system is further configured to mark (e.g. label) a returned textile item based on the identified one or more item parameters of the returned textile items.

According to some embodiments of the textile items return system, the textile items return system is further configured to reject a returned textile item based on the identified one or more item parameters of the returned textile item.

According to some embodiments of the textile items return system, the classification algorithm is generated using a computerized method for training a computational module to identify the one or more item parameters of a textile item. The method includes:

Obtaining at least image data of each of a plurality in a training set of textile items. For each textile item in the training set, at least one value of the one or more item parameters of the textile item is known.

Using artificial intelligence learning tools to train the textile items identification module by correlating the obtained image data to the known values, such as to maximize an overall identification percentage of the textile items in the training set, and thereby generate a classification algorithm.

According to some embodiments of the textile items return system, in the stage of obtaining the image data, primary data of one or more non-visual sensors is also obtained, and in the stage of using the artificial intelligence learning tools, both the obtained image data and the obtained primary data of the one or more non-visual sensors are jointly correlated to the known values.

According to some embodiments of the textile items return system, the computational module includes one or more processors and one or more memory components. The one or more memory components may include software to implement the artificial intelligence learning tools.

According to some embodiments of the textile items return system, the textile items identification module includes the computational module.

According to some embodiments of the textile items return system, at least some of the obtained image data of the textile items in the training set is obtained using the image acquisition device.

According to some embodiments of the textile items return system, the artificial intelligence learning tools include machine learning tools and/or data mining tools.

According to an aspect of some embodiments, there is provided a textile items dispensing and return (TIDR) system including a textile items return system, as described above, and a textile items dispensing system. The textile items dispensing system includes a textile items dispensing unit configured to store dispensable textile items and to dispense the textile items. The textile items return system and the textile items dispensing system are communicatively associated such as to allow managing an inventory of textile items.

According to some embodiments of the TIDR system, the textile items return unit and the textile items dispensing unit are integrated within a single unit.

According to some embodiments of the TIDR system, at least some of the dispensable textile items include a sensor-readable tag and/or pattern encoding the type of the textile item, and, optionally, when the textile item is a clothing, the type of clothing. The return compartment includes a sensor configured to read the tag and/or pattern, thereby facilitating managing the inventory of textile items and/or adjusting the classification algorithm.

According to some embodiments of the TIDR system, the tag is a radiofrequency identification tag, or the tag includes a barcode.

According to an aspect of some embodiments, there is provided a computer-readable storage medium having stored therein machine learning software, executable by one or more processors, for training the one or more processors to identify one or more item parameters characterizing a textile item. The machine learning software is configured to cause the one or more processors to, upon receipt of image data of a plurality of textile items, correlate image data of each of the textile items to at least one value of one or more item parameters characterizing the textile item, such as to maximize an overall identification percentage (probability or weighted probability, wherein some values of item parameters may be accorded a greater weight) of the textile items, and thereby generate a classification algorithm configured to identify, based on image data of a textile item, the one or more item parameters of the textile item.

According to an aspect of some embodiments of the storage medium, the storage medium may have further stored therein a training set of data including at least some of the values of the one or more item parameters characterizing the textile items.

According to an aspect of some embodiments of the storage medium, the image data, pertaining to each of the plurality of textile items, includes at least one image obtained by an image acquisition device.

According to an aspect of some embodiments, there is provided a computerized method for training a computational module to identify one or more textile item parameters. The method includes:

Using an image acquisition device to obtain image data of each of a plurality of textile items. For each textile item, from the plurality of textile items, at least one value of one or more item parameters of the textile item is known.

Using artificial intelligence software to train the computational module by correlating the obtained image data to the known values, such as to maximize an overall identification percentage of the textile items in the training set, and thereby generate a classification algorithm.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In block diagrams and flowcharts, optional elements/components and optional stages may be included within dashed boxes.

In the figures:

FIG. 1A is a block diagram of a textile items return system including a textile items return unit and a textile items identification module, which may be included in the textile items return unit, according to some embodiments;

FIG. 1B illustrates a computational architecture of a textile items identification module, which is a specific embodiment of the textile items identification module of FIG. 1A;

FIG. 2 is a block diagram of a textile items return system including a textile items return unit and a cloud-based textile items identification module functionally associated with the textile items return unit, according to some embodiments; and FIG. 3 is a flowchart of a computerized method for training a computational module to identify textile items, according to some embodiments.

DETAILED DESCRIPTION OF THE INVENTION

Figure 1A:
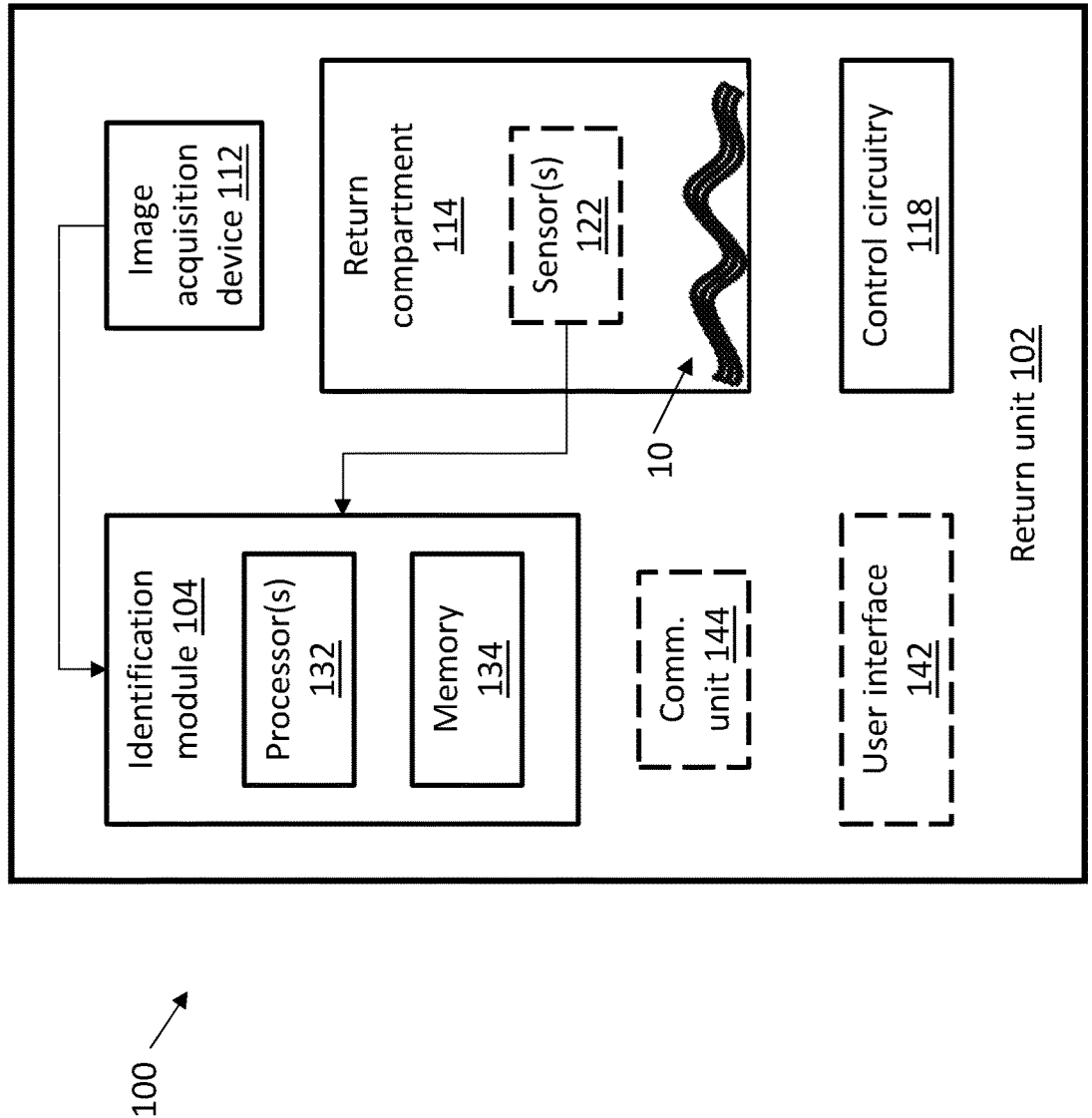

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

As used herein, the term "dispensable", in reference to an item, such as a textile item, in a dispensing system, vending machine, and the like, is used to refer to an item that is dispensed by the dispensing system, i.e. an item released by the dispensing system to a user who requested the item.

As used herein, the term "value", particularly in reference to an item parameter, is employed in a broad sense to cover not only numerical values of the item parameter (e.g. the length of a sleeve in centimeters), but especially categorical values, such as "red", "blue", "yellow", and so on, with respect to color (e.g. of a textile item), "shirt", "pants", "skirt", and so on, with respect to the type of clothing, "small", "medium", and "large" with respect to the size of a clothing item (article), and so on. It will be understood that a categorical value may be represented by a numerical value. For example, the categorical values "small", "medium", and "large" may be represented, for instance, by the numerical values "1", "2", and "3". In order to facilitate the description, the term "value", when used in reference to an item parameter, may be used without an additional qualifier such as "numerical" and "categorical".

Similarly, as used herein, the term "value", in reference to a feature of an item such as a textile item, or a pattern on a textile item, is employed in a broad sense to cover not only numerical values of the feature/pattern (e.g. a length of zipper in centimeters, the number of buttons on a textile item, the distances between adjacent buttons in centimeters), but especially categorical values, such as "the textile item includes a button(s)" or "the textile item does not include buttons", or "the textile item includes a striped pattern", "the textile item includes a floral pattern", or "the textile does not include any pattern", and so on.

Systems

According to an aspect of some embodiments, there is provided a textile items return system. FIG. 1A is a block diagram of such a textile return system, a textile items return system 100, according to some embodiments. Return system 100 includes a textile items return unit 102 and a textile items identification module 104. Return unit 102 includes an image acquisition device 112 and a return compartment 114. Return compartment 114 may constitute a volume within return unit 102, which is shaped and dimensioned to accommodate a textile item (e.g. a returned textile item), such that image acquisition device 112 may acquire image data (e.g. digital images) of the textile item.

According to some embodiments, and as depicted in FIG. 1A, identification module 104 may be housed in return unit 102. According to some alternative embodiments, identification module 104 may be housed in a casing outside return unit 102.

Also indicated is a control circuitry 118. Control circuitry 118 is communicatively associated with identification module 104 and may be configured to initiate operations, such as a sorting operation following identification of a return textile item by identification module 104, as elaborated on below. Control circuitry 118 may include processing circuitry and memory components configured to control operational features, of return unit 102, related to the operation of electronic and electromechanical components in return unit 102. For example, automated infrastructure (not shown) for grasping and transporting a returned textile item within return unit 102 (e.g. to an intended sorting compartment), a user interface (when present), a communication unit (when present), and so on. Control circuitry 118 may further be configured to switch on and off and regulate the supply of power to various electronic and electromechanical components in return unit 102, such as image acquisition device 112, non-visual sensors (if present), the automated infrastructure, and so on.

In FIG. 1A a returned textile item 10 is shown accommodated within return compartment 114 on a bottom surface of return compartment.

According to some embodiments, return unit 102 may include, e.g. on a front surface thereof, a slot, a door, a cover (or other type of opening; not shown) wherethrough a user may insert a returned textile item. Return compartment 114 may be positioned such that a textile item inserted via the slot slides onto the bottom surface of return compartment 114. According to some alternative embodiments, return compartment may constitute a drawer or a door, which may be opened (e.g. automatically or by a user pulling such drawer or door) in order to place therein a returned textile item (following which the user may pushed the drawer closed or the drawer may close automatically). More generally, return unit 102 may include infrastructure, which may be mechanical and/or automated, which allows a user to return a textile item such that the returned textile item "ends up" in return compartment 114.

According to some embodiments, image acquisition device 112 may include one or more digital cameras configured to obtain images of a textile item accommodated in return compartment 114. For example, according to some embodiments, image acquisition device 112 may include a digital camera configured to obtain top perspective (e.g. birds-eye view) images of a textile item. According to some embodiments, image acquisition device 112 may include a plurality of digital cameras configured to obtain images of a textile item from a plurality of perspectives, e.g. from a top perspective and from different side perspectives (i.e. at different angles). The digital cameras may accordingly be positioned: For example, to obtain top perspective images a digital camera may overlook the bottom surface of return compartment 114 and may be positioned above return compartment 114 (e.g. when return compartment 114 is not closed from above), or the digital camera may be positioned on (e.g. attached to, hung from, embedded on) a top surface of return compartment 114 (e.g. when return compartment 114 is closed from above). Similarly, to obtain side perspectives images, a digital camera may be positioned on a sidewall of return compartment 114. According to some embodiments, mirrors may be employed to obtain different perspective views.

According to some embodiments, and as elaborated on below, image acquisition device 112 may include (or further include) an infrared camera and/or an X-ray camera.

According to some embodiments, return unit 102 may further include one or more non-visual sensor(s) 122, such as a metal detector (e.g. a magnetic sensor), a weight sensor, humidity sensor, and the like, or combinations thereof. The metal detector may be configured to detect (sense) presence of a metallic object(s) accommodated along with a textile item(s) in return compartment 114, in particular, when the metallic object(s) is hidden from view (e.g. is within a pocket of a returned clothing item). Examples of metallic objects include smartphones, coins, pens, watches, rings, scissors, needles, and the like. The weight sensor is configured to measure the weight of an item(s) accommodated within return compartment 114. Considerably excessive weight may indicate possible presence of a rigid object (e.g. plastic, rubber or metallic) accommodated along with a returned textile item in return compartment 114. Considerably excessive weight may also indicate the possibility that a returned textile item is wet.

Identification module 104 is configured to receive image data from image acquisition device 112 and to process the image data such as to generate at least one value of one or more item parameters pertaining to an item (accommodated in return compartment 114), and, in particular, a textile item. The one or more parameters may include one or more of a type, a characteristic(s), and a condition(s) of the textile item. According to some embodiments, the (value(s) of the) type may specify whether a returned item is a textile item, and, if so, whether the textile item is, for example, a clothing item, a bed linen, a tablecloth, a towel, or none of the above. According to some embodiments, the type may further specify, when the textile item is a clothing, whether the clothing is, for example, a scrub (e.g. when the return unit is used in hospital), a shirt, a pair of pants, a dress, a skirt, a sock(s), underwear, and/or bathrobe. According to some embodiments, the type may further specify, when the textile item is a bed linen, whether the linen is, for example, a bedlinen is a sheet, a pillowcase, or a duvet cover.

According to some embodiments, the (value(s) of the) characteristic(s) may specify, for example, at least one of a weight, measurements (dimensions), and/or a color of a textile item, and/or, when the textile item is a clothing, a size of the clothing (e.g. small, medium, or large). According to some embodiments, the characteristics may further specify, when the textile item is a clothing item, whether the clothing item is intended to be worn by a woman, a man, or whether the clothing item is unisex.

According to some embodiments, the (value(s) of the) condition(s) may specify, for example, at least one of a level of cleanliness of the textile item, a level of dampness of the textile item, and a degree of damage to the textile item. According to some embodiments, the level of cleanliness may be selected from clean and soiled. According to some embodiments, the level of cleanliness may include at least clean, lightly soiled, and very soiled. According to some embodiments, the level of dampness may be selected from dry and wet. According to some embodiments, the level of dampness may include at least dry, damp, and wet. According to some embodiments, the degree of damage may be selected from undamaged (intact) and damaged. According to some embodiments, the degree of damage may be selected from undamaged (intact), lightly damaged, and very damaged (e.g. implying that the textile item is to be disposed or recycled).

More specifically, identification module 104 includes at least one processor 132 and memory components 134 (non-volatile and volatile). The non-volatile memory may have stored therein a classification algorithm, executable by the at least one processor 132, configured to identify the one or more item parameters pertaining to a textile item accommodated in return compartment 114. The classification algorithm may essentially constitute image recognition software (or, more generally, computer vision software) especially tailored to identify a textile item (e.g. at least the type thereof) regardless of the state the textile item is in, e.g. whether crumpled, folded, creased, torn, soiled, and so on. According to some embodiments, the classification algorithm may be implemented using an artificial neural network (ANN), such as a deep neural network, a convolutional neural network, and the like. The classification algorithm may be generated using machine learning tools, data mining tools, deep learning tools, and, more generally, artificial intelligence (AI) learning tools, as elaborated on below in the description of FIG. 3.

According to some embodiments, identification module 104 may be further configured to count a number of (e.g. returned) textile items accommodated in return compartment 114, and, optionally, further identify one or more item parameters pertaining to each of the textile items. In such embodiments, for example, a pair of socks may be returned together instead of one after the other.

According to some embodiments, return system 100 may be further configured to sort returned textile items. For example, according to some embodiments, return unit 102 may include sorting compartments (not shown). Each sorting compartment may correspond to a set of values of item parameters. That is, return system 100 may be configured to distribute returned textile items such that returned textile items characterized by a certain set of values (of item parameters) are conveyed to a corresponding sorting compartment. For example, one sorting compartment may be intended for clothing and another sorting compartment may be intended for non-clothing textile items. As another example, one sorting compartment may be intended for clean and undamaged clothing, a second sorting compartment for soiled and undamaged clothing, a third sorting compartment for damaged clothing, and so on.

According to some embodiments, the sorting compartments may include a sorting compartment for non-textile items, such as metallic objects, which may function as a "lost and found" compartment. According to some embodiments, the sorting compartments may include a sorting compartment for unidentified (unclassified) items, whether textile or non-textile. According to some embodiments, damaged-beyond-repair textile items may be conveyed to a dedicated sorting compartment. According to some embodiments, damaged-beyond-repair textile items may each be conveyed to one of two sorting compartments according to whether the textile item is to be disposed or recycled.

According to some embodiments, return unit 102 may be set within a wall separating, for example, a hospital corridor, from a hospital laundry room. More generally, return unit 102 may be set within wall separating a first space from a second space such that a front surface of return unit 102 is accessible from the first space and a backwall of return unit 102 is accessible from the second space. The second space may constitute a room (e.g. a laundry room or a storage room) onto which returned textile items are to be delivered (via return system 100). A user in the first space may deposit an item within return unit 102 using e.g. a dedicated slot on the front surface of return unit 102.

According to some such embodiments, return unit 102 does not include sorting compartments, including instead sorting openings (e.g. holes, slots) on a backwall of return unit 102. Inside the second space, below each sorting opening may be positioned a container (e.g. basket) intended to receive returned textile items. According to some embodiments, return unit 102 may include automated infrastructure, functionally associated with control circuitry 118 and configured to (once the returned textile item has been classified) to convey the returned textile item to a corresponding sorting opening and eject the returned textile item through the sorting opening onto the container positioned below the sorting opening.

According to some embodiments, return unit 102 may include infrastructure configured to label (mark) each returned textile item with the classification thereof (as determined by identification module 104). The label may be in the form of a paper note, with the classification printed thereon, which may be stapled onto the textile item.

According to some embodiments, return unit 102 may include a user interface 142 functionally associated with control circuitry 118. User interface 142 may be configured to present information to a user, as elaborated on below. For example, user interface 142 may include a display and/or a speaker. According to some embodiments, user interface 142 may be interactive, allowing for user input, as elaborated on below. For example, the display may be a touch screen, and/or user interface 142 may include buttons, knobs, and/or a microphone.

According to some embodiments, return unit 102 may be configured to reject a returned item. For example, when the returned item is not a textile item, not a returnable textile item, when a textile item is too damaged, and so on. In another example, the return unit may be configured to reject a returned item when the returned item is not the item that has been dispensed to the user returning the item. An example of a non-returnable textile item is provided, for example, by everyday apparel in embodiments wherein return system 100 is used in a hospital and is intended to receive only hospital issued textile items such as scrubs, hospital gowns, hospital pajamas, bed linen, and/or towels. According to some embodiments, the user may be notified of the rejection via user interface 142, and/or return unit 102 may include automated infrastructure configured to eject a rejected (returned) item.

According to some embodiments, return unit 102 may include a communication unit 144. According to some embodiments, communication unit 144 may be configured for wireless communication using a cellular network and/or Wi-Fi. According to some embodiments, communication unit 144 may obviate the need for a user interface (such as user interface 142), by allowing for the option of using a mobile computational device of a user (e.g. a smartphone) to present information to the user and to enter user input.

According to some embodiments, identification module 104 may be configured to "learn", that is, to adjust, update, and improve the classification algorithm used to identify returned items. More specifically, according to some embodiments, identification module 104 may be configured to allow for supervised learning. For example, on returning a textile item, a user may be asked to specify (e.g. using the user interface or a mobile computational device of the user) the type of item, characteristics thereof, and the condition thereof. Identification module 104 may then run the classification algorithm to verify that the output of the classification matches the specification provided by the user. If not, identification module 104 may accordingly modify the classification algorithm (taking the specification of the user into account), as elaborated on below in the description of FIG. 3.

According to some embodiments, identification module 104 may be configured to issue a report including at least a list of unidentified items, and in particular textile items. Advantageously, this allows for a system manager of return system 100 to review the report and provide the correct classification to identification module 104, thereby allowing to update the classification algorithm. According to some embodiments, the issued report may further include at least some identified items, and in particular identified textile items. Advantageously, this option affords the possibility of quality control in the sense of allowing the system manger to verify the correctness of the classification, and if necessary, correct the classification. The corrected classification may then be used to modify and improve the classification algorithm.

According to some embodiments, return system 100 may be used in conjunction with a textile items dispensing system (not shown), thereby allowing for tracking and management of inventory, as explained below. Return system 100 and the dispensing system may be communicatively associated. According to some embodiments, whenever the dispensing system dispenses one or more textile items, dispensing system notifies return system 100—and optionally a central computer configured to manage inventory—of the number and types of the dispensed textile items. Similarly, according to some embodiments, whenever one or more textile items are returned to return system 100, return system 100 notifies the dispensing system, and optionally the central computer, of the number and types of the returned textile items.

According to some embodiments, return system 100 may notify the central computer, and optionally the dispensing system, when a damaged textile item has been returned. According to some embodiments, return system 100 may notify the central computer and/or a laundry room computer of a number of soiled textile items (optionally including the numbers of each type of soiled textile items) that have been returned during e.g. the day or the morning. Advantageously, this allows the laundry staff to prepare in advance for the arrival of a laundry delivery including the soiled textile items.

According to some embodiments, a user is required to identify theirself before being issued a textile item from the dispensing system and returning a textile item to return system 100. In particular, according to some embodiments, return system 100 may be configured verify that a textile item returned by a user is in fact the same textile item dispensed thereto. According to some embodiments, return system 100 may further be configured to notify the user when they have returned a textile item(s) different from the textile item(s) issued thereto. Advantageously, this allows for keeping track of inventory at the level of a single user. According to some embodiments, the dispensing system may be configured such that a user who has yet to return one or more textile items, may not be issued any other textile items.

According to some embodiments, a dispensing unit of the dispensing system and return unit 102 may be housed in a common unit and share one or more computational resources and/or infrastructure e.g. to receive and deliver a textile item, to transport the textile item within the common unit, and so on.

According to some embodiments, one or more of return system 100 may be used in conjunction with one or more of dispensing systems (and a central computer configured to manage inventory). Each of the different dispensing systems and/or each of the different return systems 100 may be located, for example, in a different hospital wing, and may be communicatively associated and share returned/dispensing textile items data.

Figure 1B:
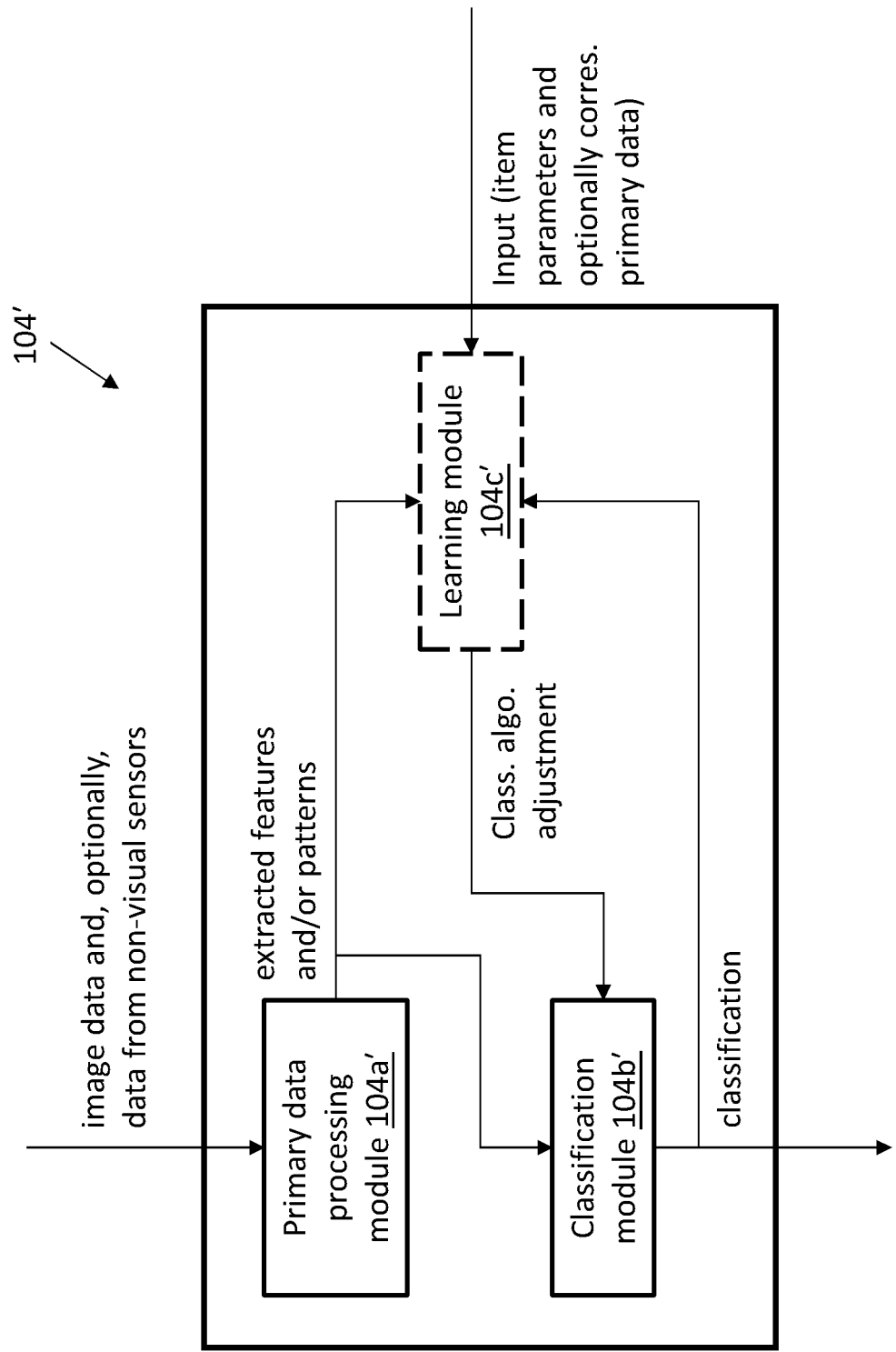

FIG. 1B illustrates a computational architecture of a textile items identification module 104', according to some embodiments. Identification module 104' is a specific embodiment of identification module 104. Identification module 104' includes a primary data processing module 104a' and a textile items classification module 104b'. Primary data processing module 104a' is configured to at least receive image data (e.g. digital images) of a textile item, from image acquisition device 112, and process the image data to extract one or more values parameterizing (specifying) features and/or patterns of the textile item. The parameterizing values are sent to classification module 104b', wherein the values are processed, and the textile item is classified.

The features may specify, for example, whether buttons are visible in the received digital image(s), and if so, the number of buttons visible, and distances there between. The features may specify, for example, whether a zipper is visible in the received digital image(s). The features may specify, for example, whether a collar is visible in the received digital image(s). It is to be understood that such data may be pertinent in determining whether the textile item is, for instance, an article of clothing or a towel. Additionally or alternatively, the features may specify whether seams are visible in the received digital image(s), and if so, the number of seams visible. If a plurality of seams is visible, patterns, formed by the seams, may be identified. These may include a 'T'-pattern formed by two seams, or an 'X'-pattern formed by two intersecting seams. A T-pattern of two seams may be present, for example, at the bottoms of each of the two pant legs of a pair of pants. Other identifying features may specify whether a seam is, or seems to be, circumferential, as at the distal end of a sleeve. A distance of a circumferential seam from an end of a piece of apparel may help distinguish between a long-sleeved shirt and a pant leg, and so on. Yet other identifying features, may include strings and knots: Strings may be used to tie hospital gowns, or may be used instead of a belt in hospital pants and pajamas (which may often be removed without untying the knot).

Another potentially important class of features includes colors. For example, hospital scrubs may be of different color than hospital gowns, bed linen, and towels. Different textile items may also differ from one another in embellishment patterns thereon, such as patterns of stripes (in which case the number of stripes, distances there between, and so on, may be pertinent), a plaid pattern, flower embellishments, and so on.

According to some embodiments—for example, when return system 100 is intended to be used in a health care facility, such as, a hospital—an issued textile item, which is to be returned to return system 100, may purposefully include a pattern to facilitate the identification thereof. The pattern may be introduced onto the textile item during fabrication, or at a later stage (for example, in the hospital). According to some embodiments, the pattern may be easily distinguished by the naked eye, while according to some other embodiments, the pattern may not be distinguishable (or at least hard to spot) by the naked eye, but easily distinguishable by identification module 104 (at least following learning/training). According to some embodiments, the pattern may cover most of the textile item. According to some embodiments, the pattern may be a repeating pattern. According to some embodiments, textile items of the same type and/or characteristic(s) may include an identical pattern. According to some embodiments, each issued textile item may include a unique pattern, which is not present on any other issued textile item (even if of the same type and characteristic(s)), thereby allowing for individual tracking of each issued textile item.

More generally, in embodiments wherein return unit 102 further includes non-visual sensor(s) 122, primary data processing module 104a' may be configured to receive primary data from both image acquisition device 112 and non-visual sensor(s) 122, and to extract therefrom (from the primary data) values parameterizing the features and/or patterns. For example, in embodiments wherein non-visual sensor(s) 122 is, or includes, a weight sensor, the features may include the weight of a textile item. The weight may help in distinguishing, for instance, a small towel from a pillowcase.

As used herein, according to some embodiments, the term "primary data" refers to the output of digital cameras, sensors, detectors, and the like (prior to having gone any processing by computational elements, such as primary data processing module 104a'). According to some embodiments, the terms "primary data" and "raw data" may be used interchangeably.

Classification module 104b' may include custom software configured to, based on the parameterizing values (of features and/or patterns) obtained with respect to a textile item, classify the textile item.

According to some embodiments, identification module 104' may be configured to "learn", that is, to adjust, update, and/or improve the classification algorithm used to identify returned items, essentially as described above with respect to identification module 104. In such embodiments, identification module 104' may include an additional module, a learning module 104c', which is configured to receive a correct classification of a returned textile item, for example, by the user returning the textile item (e.g. using user interface 142 or a smartphone thereof). Learning module 104c' is further configured such as to-if the classification provided by classification module 104b' is wrong, i.e. does not agree with the (received) correct classification-modify the software executable by classification module 104b' and optionally primary data processing module 104a', to correct for the discrepancy.

According to some embodiments, learning module 104c' may be used for training identification module 104', in the sense of training identification module 104' "from scratch" or substantially "from scratch". In such embodiments, learning module 104c' may be configured to receive a training set of pairs of data. Each pair of data may include image data of an item (and, in particular, a textile item) and a corresponding and correct classification of the image data, that is, the type of textile item, characteristics thereof, e.g. size and color, and the condition thereof, e.g. soiled and undamaged. According to some embodiments, each pair of data may include primary data of a textile item (i.e. image data and readings of non-visual sensors) and a corresponding and correct classification of the textile item.

It is noted that image data of a textile item (as well as optionally non-sensor visual data thereof) and the correct classification constitute a correspondence, which is pre-determined in the sense that the correct classification (i.e. value(s) of one or more item parameters of the textile item) is known. Image data of a plurality of textile items and the correct classifications of each of the textile items, constitute a set of pre-determined correspondences, wherein each pre-determined correspondence relates at least one known (and, hence, pre-determined) and correct classification (i.e. value(s) of the one or more item parameters) of a given textile item at least to image data of the textile item.

The image data may be obtained from image acquisition device 112 but this need not necessarily be the case. According to some embodiments, some of the image data, pertaining to at least some of the textile items "depicted" in the image data, may be obtained using other image acquisition devices (which are not installed within return unit 102) and may therefore allow for more varied views of the textile items. More varied views may potentially facilitate identification of extractable features and patterns. The correct classification of the image data may be performed by the human eye. According to some embodiments, the image data pertaining to at least some of the textile items, depicted in the image data, may be obtained using an image acquisition device positioned in, or functionally associated with, a dispensing system during the dispensing of the textile item. (So that the classification thereof is known, e.g. according to a compartment wherefrom the textile item has been retrieved).

According to some embodiments, during the training, textile items may be provided with a radiofrequency identification (RFID) tag having stored therein the correct classification of the textile item. Return unit 102 may be equipped with a radiofrequency reader device configured to "read" the correct classification. Each data pair then includes image data of the textile item, which is obtained by image acquisition device 112, and the correct classification, which is read from the RFID tag on the textile item. Each data pair is sent to learning module 104c', which may them use the data pair in the training of primary data processing module 104a' and classification module 104b'.

As further elaborated on below in the description of FIG. 3, during the training, learning module 104c' constructs the classification algorithm. That is to say, learning module 104c' may program primary data processing module 104a' to identify features and patterns which are found to be, or established as, pertinent during the training and extract values thereof (e.g. distances between buttons). Further, learning module 104c' may program classification module 104b' to correctly classify a textile item based on the values of features and patterns extracted from the image data thereof.

According to some embodiments, each of modules 104a' and 104b', and, optionally, module 104c', may be realized by different processors, respectively. According some embodiments, each of modules 104a' and 104b' and, optionally, module 104c', may be realized by the same processor or group of processors.

Figure 2:
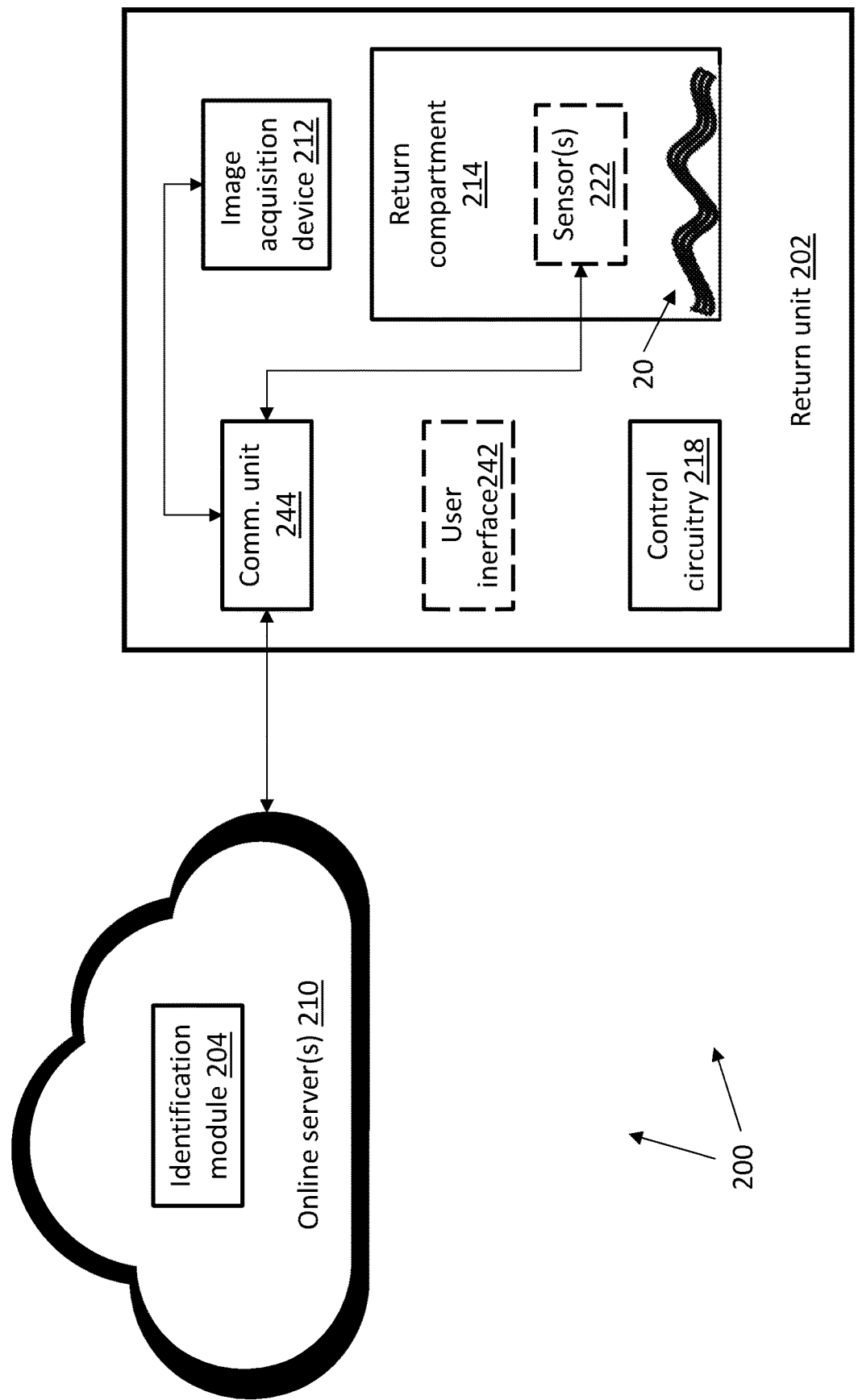

FIG. 2 is a block diagram of a textile items return system 200, according to some embodiments. Return system 200 includes a textile items return unit 202 and a textile items identification module 204. Return system 200 is similar to return system 100 but differs therefrom in that identification module 204 is located remotely from return unit 202 (whereas in return system 100 identification module 104 may be included in return unit 102). In particular, identification module 204 may be, or may be included in, an online server(s) 210.

Thus, in return system 200 the classification of returned textile items—as well as associated learning and training of identification module 204—is performed on a remote location, such as, the cloud (online).

Return unit 202 includes an image acquisition device 212 and a return compartment 214, which may be essentially similar to image acquisition device 112 and return compartment 114 of return unit 102. Return unit 202 further includes a control circuitry 218 and a communication unit 244. Identification module 204 is communicatively associated with return unit 202, via communication unit 244, and thereby with image acquisition device 212 and, optionally, control circuitry 218.

According to some embodiments, return unit 202 further includes a non-visual sensor(s) 222, which may be similar to non-visual sensor 122. According to some embodiments, return unit 202 further includes a user interface 242, which may be essentially similar to user interface 142. User interface 242 may be functionally associated with control circuitry 218 and, optionally, identification module 204.

According to some embodiments, not depicted in the figures, there is provided a (textile items) return system. The return system includes a (textile items) return unit and a (textile items) identification module. The return system is similar to each of return system 100 and return system 200 but differs from both in that the identification module of the return system is distributed in the sense that some computation modules, included in the identification module, are realized on one or more processors included in the return unit, while other computational modules, included in the identification module, may be realized remotely, e.g., on an online server(s). For example, according to some embodiments, wherein the identification module is similar to identification module 104', including a primary data processing module, a classification module, and a learning module (similar to primary data processing module 104a', classification module 104b', and learning module 104c', respectively), the primary data processing module and the classification module may be realized on one or more processors included in the return unit and the learning module may be implemented remotely (for example, online or cloud-based).

Methods

According to an aspect of some embodiments, there is provided a computerized method for training a computational module, such as identification modules 104, 104', and 204, to identify textile items based at least on image data thereof. The identification may include not only the type of the textile item (e.g. clothing or bed linen), but also characteristics thereof (e.g. color and measurements), as well as a condition thereof (e.g. soiled, intact). FIG. 3 provides a flowchart of such a computerized method, a computerized method 300, according to some embodiments. Method 300 may include stages of:

A stage 310 wherein primary data (i.e. image data and optionally non-visual sensor data) of each of a plurality of textile items in a training set of textile items is obtained. For each of the textile items in the training set, at least one value of one or more item parameters of the textile item is known.

A stage 320 wherein artificial intelligence learning tools are used to train a computational module by correlating at least some of the obtained primary data to the respective known values in such a way as to maximize an overall identification percentage of the textile items, thereby generating the classification algorithm.

An optional stage 330 wherein primary data of each of a plurality of textile items in an additional training set of textile items (e.g. representing new and different inventory) is obtained. For each of the textile items in the additional training set, at least one value of one or more item parameters of the textile item is known.

An optional stage 330 wherein the artificial intelligence learning tools are used to modify the computational module such as to maximize an overall identification percentage of the textile items in the both original training set and the additional training set, thereby updating the classification algorithm.

It is noted that the primary data (of the plurality of textile items in the training set), acquired in stage 310, and the known value(s) pertaining to each of the items, constitute a set of pre-determined correspondences, wherein each pre-determined correspondence relates at least one known (and, hence, pre-determined) value of the one or more item parameters, of a respective textile item from the training set, to primary data of the textile item.

In stage 320 a stability of the generated classification algorithm may be tested by setting aside some of the obtained primary data (and the respective know values) to verify that the classification algorithm also performs well with respect to primary data that were previously not used in the training. If the classification algorithm performs worse with respect to the previously set aside primary data, then stage 320 may be repeated taking into account the greater set of primary data (and the respective known values) until stability is attained.

According to some embodiments, in stage 320, the training may be continued until the classification algorithm correctly classifies textile items at probability greater than a threshold probability, for example, 85%.

According to some embodiments, wherein the classification algorithm is an ANN, in stage 320, the architecture, e.g. number of nodes, layers, and the values of the weights of the ANN are determined. If the classification algorithm is not stable (in the sense described above), then the weights, and optionally other aspects of the architecture, may be further adjusted until stability is achieved.

Stages 330 and 340 are optional and may be implemented, for example, when new and different inventories are to be introduced. For example, the computational module may have been trained in stage 320 to identify clothing, while it is desired that the computational module may further be able to identify bed linen and towels.

According to some embodiments, the artificial intelligence learning tools include machine learning tools and/or data mining tools.

According to some embodiments, a training module may be used to train the computational module. According to some embodiments, the training module may be located on an online server, while the computational module may be included in a return unit such as return unit 102. According to some embodiments, both the training module and the computational module may be implemented using common computational resources, i.e. processors and memory components shared there between.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A textile items return system comprising a textile items return unit and a textile items identification module, the textile items return unit comprising:
   an image acquisition device configured to acquire image data of a returned textile item;
   a return compartment configured to accommodate a returned textile item such as to allow the image acquisition device to acquire image data of the returned textile item; and
   a user interface and/or a communication unit allowing a user to input at least one value of one or more item parameters of a returned textile item;
wherein the textile items identification module comprises one or more processors and one or more memory components and is configured to receive the acquired image data and, based at least thereon, identify one or more item parameters of the returned textile item, using a classification algorithm configured to correlate image data of a textile item to one or more item parameters of the textile item; and
wherein the textile items return system is further configured to issue a notification and/or to reject a returned item to the user, based on the identified one or more item parameters of the returned item and/or the input from the user.

2. The textile items return system of claim 1, wherein the classification algorithm comprises an image recognition sub-algorithm.

3. The textile items return system of claim 1, wherein the one or more item parameters comprise one or more of: at least one type, at least one characteristic, and at least one condition of a textile item.

4. The textile items return system of claim 3, wherein the at least one type of the textile item is selected from clothing, bed linen, tablecloths, and/or towels and/or wherein the one or more item parameters further comprise one or more types of clothing, wherein the one or more types of clothing comprise scrubs, shirts, pants, dress, skirts, socks, underwear, and/or bathrobes.

5. The textile items return system of claim 4, wherein the at least one characteristic of the textile item comprises one or more of a size, measurements, weight, and color and/or wherein the at least one condition of the textile item comprises one or more of a level of cleanliness of, a degree of dampness of, and a degree of damage to the textile item, wherein the level of cleanliness comprises at least clean and soiled, the degree of dampness comprises at least dry and wet, and the degree of damage comprises at least undamaged and damaged and/or disposable.

6. The textile items return system of claim 1, wherein the image acquisition device comprises one or more digital cameras and/or wherein the image acquisition device comprises one or more infrared cameras.

7. The textile items return system of claim 1, wherein the image acquisition device comprises an X-ray camera and/or wherein the return compartment comprises one or more non-visual sensors comprising one or more of a weight sensor and/or a metal detector.

8. The textile items return system of claim 1, wherein the textile items identification module is further configured to adjust the classification algorithm based on one or more pre-determined correspondences pertaining to a set of textile items, wherein each pre-determined correspondence relates at least one value of the one or more item parameters, of a respective textile item from the set, at least to image data of the textile item.

9. The textile items return system of claim 1, wherein the textile items identification module comprises a primary data processing module and a classification module, wherein the primary data processing module is configured to process image data, and, optionally, sensor data received from the one or more sensors, to obtain values of features and/or patterns of a textile item, and wherein the classification module is configured to process the values to obtain the one or more item parameters of the textile item and/or wherein the textile items identification module further comprises a learning module configured to adjust the classification algorithm based on the one or more pre-determined correspondences pertaining to a set of textile items.

10. The textile items return system of claim 1, wherein the input facilitates determining a correspondence between the at least one value and image data of the textile item after acquisition thereof by the image acquisition device.

11. The textile items return system of claim 1, wherein the textile items return unit comprises the textile items identification module and/or wherein the textile items return unit further comprises a communication unit and a control circuitry configured to operate the return unit, and wherein the textile items identification module is constituted by one or more online servers and is functionally associated with the control circuitry via the communication unit.

12. The textile items return system of claim 9, wherein the textile items return unit further comprises a communication unit and a control circuitry configured to operate the return unit, and wherein the textile items identification module is distributed, such that some, but not all, of the modules, making up the textile items identification, are constituted by one or more online servers and functionally associated with the rest of the modules via the communication unit.

13. The textile items return system of claim 12, wherein the textile items identification module further comprises the learning module, and wherein the learning module is constituted by the one or more on-line servers.

14. The textile items return system of claim 1, further configured to sort returned textile items to a plurality of compartments and/or output slots, based on the identified item parameters of the returned textile items; and/or wherein the textile items return unit is further configured to mark a returned textile item based on the identified one or more item parameters of the returned textile items.

15. The textile items return system of claim 1, wherein the classification algorithm is generated using a computerized method for training a computational module to identify the one or more item parameters of a textile item, the method comprising:
obtaining at least image data of each of a plurality in a training set of textile items, wherein for each textile item in the training set, at least one value of the one or more item parameters of the textile item is known; and
using artificial intelligence learning tools to train the textile items identification module by correlating the obtained image data to the known values, such as to maximize an overall identification percentage of the textile items in the training set, and thereby generate a classification algorithm.

16. The textile items return system of claim 15, wherein, in the stage of obtaining the image data, primary data of one or more non-visual sensors is also obtained, and wherein, in the stage of using the artificial intelligence learning tools, both the obtained image data and the obtained primary data of the one or more non-visual sensors are jointly correlated to the known values; and/or wherein the artificial intelligence learning tools comprise machine learning tools and/or data mining tools.

17. The textile items return system of claim 15, wherein the computational module comprises one or more processors and one or more memory components and wherein the one or more memory components comprise software to implement the artificial intelligence learning tools and/or wherein the textile items identification module comprises the computational module.

18. A textile items dispensing and return (TIDR) system comprising the textile items return system of claim 1, and a textile items dispensing system, wherein the textile items dispensing system comprises a textile items dispensing unit configured to store dispensable textile items and to dispense the textile items, wherein the textile items return system and the textile items dispensing system are communicatively associated such as to allow managing an inventory of textile items.

19. The TIDR system of claim 18, wherein at least some of the dispensable textile items comprise a sensor-readable tag and/or pattern encoding the type of the textile item, and, optionally, when the textile item is a clothing, the type of clothing, and wherein the return compartment comprises a sensor configured to read the tag and/or pattern, thereby facilitating managing the inventory of textile items and/or adjusting the classification algorithm.

* * * * *